United States Patent Office 3,289,442
Patented Dec. 6, 1966

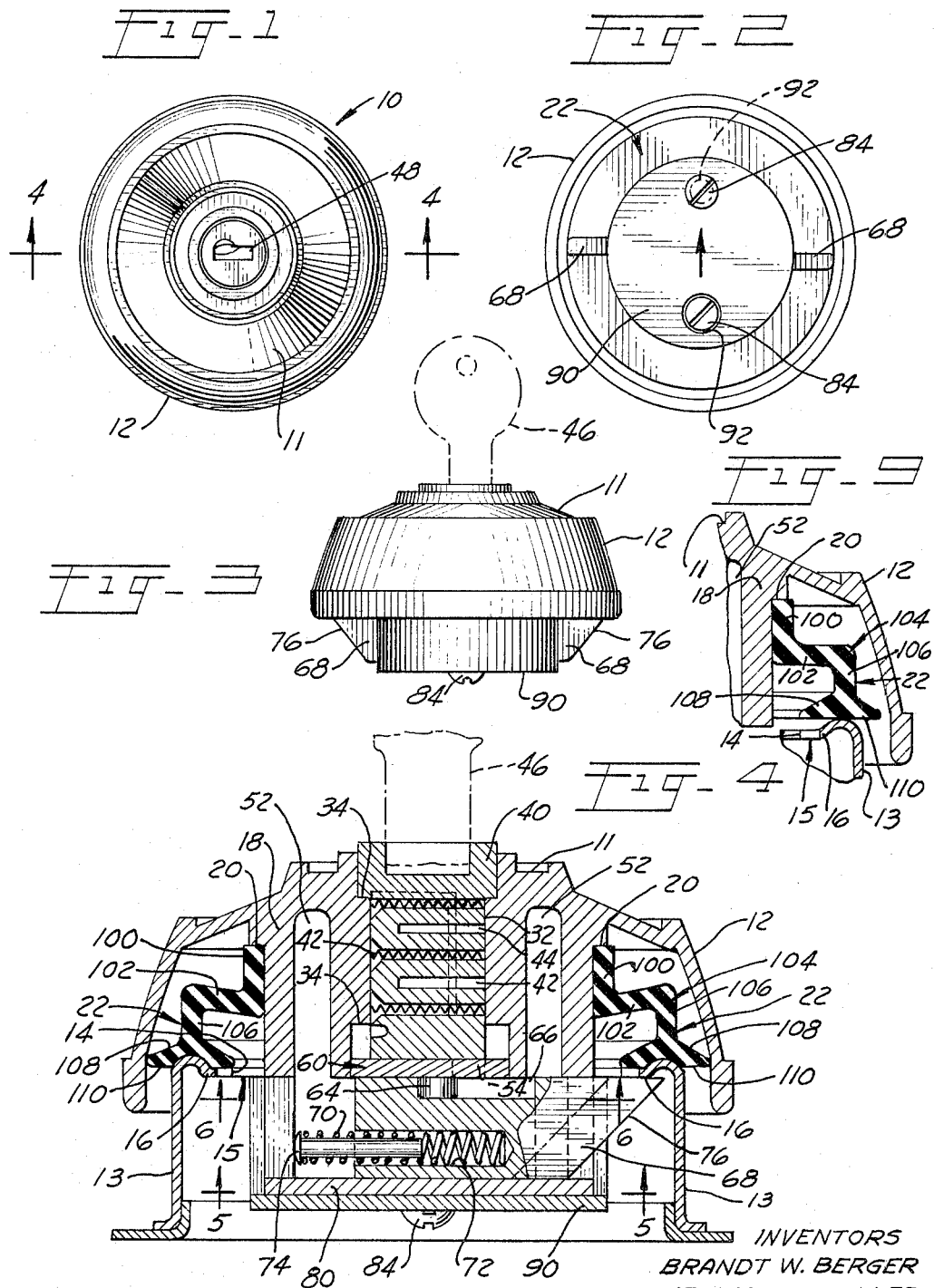

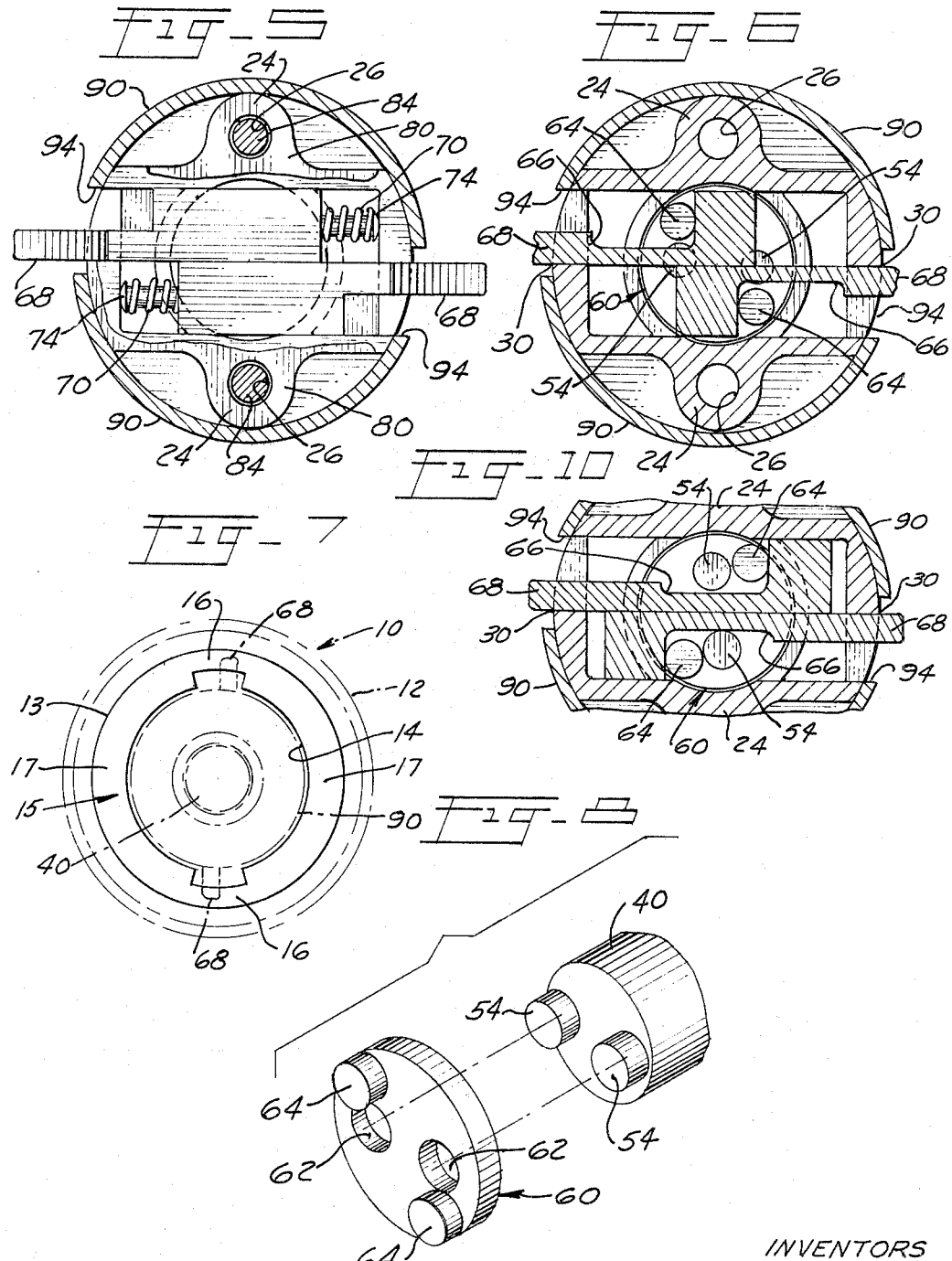

3,289,442
CLOSURE DEVICE
Brandt W. Berger, Chicago, and Jerry F. Kohler, Melrose Park, Ill., assignors, by mesne assignments, to Allen Electric and Equipment Company, Kalamazoo, Mich., a corporation of Michigan
Filed May 15, 1964, Ser. No. 367,792
7 Claims. (Cl. 70—173)

This invention relates to locking caps for the spout or filler neck of vehicle fuel tanks or the like which are uniquely designed to fit over filler necks of widely varying sizes. More specifically, this invention relates to locking caps of this type wherein the cap has a pair of retractable outwardly spring urged latch bolts carried by a downwardly extending central portion of the cap, which bolts underly a flange at the upper end of the filler neck.

Generally speaking, the upper end of the filler neck of the fuel tank of a motor vehicle has a relatively wide, inwardly extending flange defining an opening for the filler neck. The flange is partly cut away at diametrically opposed inner portions thereof leaving arcuate slots or openings of substantial size extending part way through the flange to enable the locking ears of a conventional gas cap of the bayonet locking type to be inserted into the filler neck and then turned into locking under-engagement with the wide portions of the flange. The diameter of the openings in a filler neck of a motor vehicle fuel tank, as defined by the inner margins of the wide portions of the flange, is known to vary in accordance with the specifications of the manufacturer of any particular make of vehicle, and this is the case, in many instances, even with different models of vehicles produced by the same manufacturer. Due to this lack of uniformity in the opening at the upper end of filler necks, locking gas caps of the type with which the present invention is concerned, as heretofore manufactured, were limited to use in those makes and models of vehicles having opening with a diameter sufficient to permit the insertion of the lock bolt carrying, downwardly extending central portion of the locking cap into the filler neck. Also due to the possibility that the gas cap may be inserted over the filler neck in an angular position where the latch bolts are in alignment with the filler neck flange slots referred to and the latch bolts underly only narrow portions of the flange left by the slots, the downwardly extending central portion of the cap must fit into the opening defined by the filler neck flange with limited play to prevent the cap latch bolts from being jiggled loose from beneath the narrow portions of the flange. Conventionally constructed locking caps of this type, so far as is known, make no provision for their reliable utilization on filler necks having substantially larger filler neck openings than the corresponding dimension of the outer wall of the downwardly extending central portions thereof.

The utilization of locking gas caps on filler necks of widely varying sizes has also been limited by the limited degree of movement of the latch bolts which, for example, did not extend far enough to underly the narrow portions of the flanges of much larger filler necks than the one or two similar sizes they were designed for, and could not be withdrawn far enough to permit their insertion into smaller filler necks than the one or two sizes of filler necks they were designed for.

Locking gas caps commonly include sealing rings which sealingly engage the upper surface of the filler neck flanges. The sealing rings used in locking gas caps heretofore made did not permit them to make a proper sealing fit with the flanges of filler necks of a wide variety of sizes.

It is an object of the present invention to provide a locking cap which overcomes the above described limitations of the locking caps heretofore made by enabling their reliable use with filler necks of fuel tanks or the like of a much greater variety of sizes of filler necks.

Briefly, in accordance with one aspect of the present invention, the locking gas cap has a filler neck overlying portion from which downwardly extends a central body portion which is inserted into the filler neck and which carries key operable locking bolts for retaining the device on the filler neck. The central body portion of the cap advantageously has a removable shell or cover member attached to its base which surrounds the central body portion to substantially increase the extent or size of the portion of the cap which is located within and adjacent to the filler neck flange. The removable shell or cover member of the cap of this invention is retained on the cap when it is utilized as a locking cap for filler necks having the largest diameters where it substantially restricts lateral movement of the central body portion of the cap relative to the inner margins of the flange defining the opening of the filler neck, thereby preventing unauthorized or inadvertent disengagement of the cap from the filler neck in the manner explained above. In utilizing the cap of the present invention for filler necks having smaller internal diameters, the shell or cover member simply is removed from the central body portion of the device and discarded. When thus used, the walls of the central body portion formerly covered by the removable shell or cover member fit readily into, and restrict lateral movement of the central body portion relative to the inner wall of smaller sized filler necks to a sufficient degree to thereby prevent the cap from being jarred loose or unauthorizedly pulled from its locking engagement with the filler neck.

In accordance with another aspect of the invention, in order that the latch bolts of the locking cap may be used with a wide variety of filler neck sizes no matter in what position the latch bolts may be located with relation to the top flange of the filler neck, the locking cap advantageously is provided with unique means to be described for increasing the throw of the latch bolts. The throw increasing means utilized in the device of the present invention can be employed in connection with a conventional lock plug and, therefore, has important economic advantages from the manufacturing standpoint.

In accordance with still another aspect of the invention, the versatility of the cap from the standpoint of its utility wiht filler necks of a wide variety of sizes is augmented by the provision of a unique sealing ring member for the device. The sealing ring member advantageously comprises an upper annular sleeve portion for mounting the same within the upper portion of the cap. The lower end of the sleeve portion of the sealing member is joined to an annular stepped portion, the and of the lower leg of which, in turn, is joined substantially centrally of a wide base portion having a filler neck flange engaging bottom seating surface. The extent to which the wide base portion, on either side of lower leg of the stepped portion, can flex upwardly is such that optimum contact between the wide flat seating surface of the base portion of the sealing member and filler neck flanges of various dimensions and configurations is possible, thereby enabling the sealing member to attain a substantially fluid tight seal at the open end of a wide variety of filler neck sizes.

These and other objects, advantages and features of the invention will become apparent upon making reference to the specification to follow, the claims and the accompanying drawings in which:

FIG. 1 is a top plan view of an embodiment of the closure device of the present invention;

FIG. 2 is a bottom plan view of the embodiment of the device illustrated in FIG. 1;

FIG. 3 is a side view in elevation of the embodiment of the device illustrated in FIG. 1;

FIG. 4 is an enlarged vertical sectional view taken along the line 4—4 of FIG. 1 showing the closure device of the present invention in position on the filler neck of a fuel tank;

FIG. 5 is a horizontal sectional view taken substantially along the line 5—5 of FIG. 4;

FIG. 6 is a horizontal sectional view taken substantially along the line 6—6 of FIG. 4 illustrating the position of the lugs of the multiplier disc when the latch bolts are in their fully extended position;

FIG. 7 is a top plan view of the device of the present invention mounted on the filler neck of a vehicle and showing the relationship of the various portions of the device to the top flange of the filler neck;

FIG. 8 is an enlarged exploded view of the base of the plug of the locking mechanism of the device and the adaptor or multiplier disc;

FIG. 9 is a fragmentary vertical sectional view illustrating the normal relationship and position of the various portions of the sealing member just prior to locking the device of the present invention on a filler neck; and FIG. 10 is a fragmentary horizontal sectional view corresponding to FIG. 6 illustrating the position of the lugs on the multiplier disc when the latch bolts are in a fully retracted position.

Referring now in greater detail to the drawings, the closure disc of the present invention, designated generally by numeral 10, comprises a filler neck overlying portion 11 having a downwardly and outwardly extending belled shirt 12 adapted to spacedly overhang a filler neck 13 of a fuel tank. The filler neck 13, as best seen in FIG. 7, has an opening 14 defined by an inwardly extending top flange 15 which is diametrically cut away in the conventional manner to provide narrow flange portions 16—16 and wide flange portions 17—17. The overlying portion 11 is joined to a downwardly extending central body portion 18 adapted to be inserted in the opening 14 of the filler neck. 13. See FIG. 4. The central body portion 18 is provided with a shoulder 20 adjacent the juncture of the portion 18 with the portion 11. The shoulder 20 provides an abutting surface for a resilient sealing member 22 of unique construction which will be described in detail hereinafter. The central body portion 18 is cylindrical for a short distance beneath the shoulder 20 and then is formed to provide diametrically opposed, elongated bosses 24—24 having centrally disposed tapped bores 26—26. The central body portion 18 is open at its base, and the walls thereof, joined to the walls on which the bosses 24—24 are formed, have the same radius of curvature as the upper cylindrical end of the portion 18. These curved walls are cut away for a part of their width to provide longitudinally extending diagonally opposite slideways 30—30, the function of which will become clear as the description proceeds.

The central body portion 18 further is formed with a center bore 32 which is counterbored at its upper and lower end to provide shoulders 34—34. The shoulders 34—34 provide an abutment surface for a pair of spring biased plates carried by a plug 40 positioned in the center bore 32. The center bore 32, between the shoulders 34—34, has diametrically opposed longitudinally extending grooves 42—42 formed therein into which a series of spring biased plate tumblers 44 protrude. The tumblers 44 have apertures therein through which a key 46 passes to retract the tumblers from the grooves 42—42 after which the plug 40 is rotatable in the center bore 32 by means of the key 46. The upper key-receiving end is capped and has a spring biased dust cover 48. The central portion 18 desirably is formed with diametrically opposed longitudinaly extending slots 52—52 which serve to reduce the overall weight of the device 10. The filler neck overlying portion 11 and the central body portion 18 of the device 10 may be formed from a single diecasting in accordance with conventional practices.

Referring now more particularly to FIGS. 4 through 8 of the drawings, the plug 40 is of standard construction having at its base a pair of diametrically opposed downwardly extending lugs 54—54. In achieving the objectives of the present invention, the throw of the locking mechanism of the device 10 is increased by providing an adaptor or multiplier disc 60 for the plug 40. In the embodiment illustrated, the disc 60 has a substantially larger diameter than the base of the plug 40 and is provided with two openings 62—62 for receiving the lugs 54—54 of the plug. The disc 60 is carried in the counterbored lower end of the center bore 32 and has two diametrically opposed lugs 64—64 at the edge or perimeter thereof. The lugs 64—64 of the disc 60 project into notches 66—66 of a pair of latch bolts 68—68. The bolts 68—68 are urged outwardly in opposite directions through the slideways 30—30 by compression springs 70—70. The springs 70—70, for a portion of their length, extend into horizontally extending bores 72—72 in the bolts 68—68 and are provided with pins 74—74, the heads of which abut the inner wall of the central body portion 18 adjacent the slideways 30—30.

Due to its greater diameter and the position of the lugs 64—64 thereon, the disc 60 enables the latch bolts 68—68 to extend outwardly a greater distance than normally would be possible with the more closely positioned lugs 54—54 of the conventional plug 40. The orientation of the lugs 64—64 on the larger diametered disc 60 enable the lugs 64—64 to move through a substantially greater arc than would be possible with the lugs 54—54 of the conventional plug 40 thereby permitting the latch bolts 68—68 to be fully retracted into the central portion 18 by the agency of the key 46. Thus the throw of the locking mechanism of the device 10 effectively is increased without the necessity for a specially constructed lock plug and without the necessity for special machining or appreciable modification of the device to accommodate the disc 60. The position of the lugs 64—64 when the latch bolts 68—68 are in a fully extended and a fully retracted position is illustrated clearly in FIGS. 6 and 10, respectively.

The latch bolts 68—68 advantageously are each provided with upwardly and outwardly inclined forward edges 76—76 which form an angle with the base of the latch bolts 68—68 such that it will enable a user of the device 10 to readily snap the device into secure locking engagement on a filler neck such as filler neck 13. Because of the increased throw feature of the closure device of this invention, the snap-on operation conveniently is performed by orienting the bolts 68—68 with respect to the open end of a filler neck in a manner such that the ends of the bolts will underengage the narrow portions 16—16 of the flange 15. The extent of the underengagement of the upper surface of the ends of the latch bolts 68—68, adjacent the forward edges 76—76, with the abutment surface provided by the narrow portion 16—16 is sufficient to enable the device 10 to be securely locked in position on the filler neck and to prevent its unauthorized or inadvertent removal therefrom.

The open, lowermost end of the central body portion 18 of the device 10 desirably is provided with a closure plate 80 which corresponds generally in shape to that of the lowermost end of the portion 10. The closure plate 80 has a pair of openings for receiving screws 84—84 which are threaded into tapped bores 26—26 to hold the plate 80 on the bottom of the central body portion 18.

A further important feature of the present invention is the provision of a cup-shaped, cylindrical, removable cover member or shell 90 for the base of the central body portion 18. The shell 90 advantageously has an internal diameter slightly greater than the diameter of the upper cylindrical area of the central body portion 18 and conveniently is held in position on the central body portion 18 by providing diametrically opposed openings 92—92 in the lower wall thereof for receiving the screws 84—84. In the preferred embodiment illustrated, the openings are of different sizes, one of them being large enough to permit the head of one of the screws 84 to pass through it and engage the plate 80, the other of them being of a diameter to enable the head of the other screw 84 to engage the bottom surface of the lower wall of the shell 90. This arrangement requires only one screw to be removed from the boss 24 and greatly facilitates removal of the shell 90. The shell 90 has a pair of diametrically opposed notches 94—94 in the upwardly extending wall thereof which are aligned with the slideways 30—30 to permit the latch bolts 68—68 to pass therethrough. The shell 90 of the device 10 increases the effective outer diameter of the central portion 18 and enables the device to be used as a locking cap for those makes and models of vehicles having filler necks with openings of larger internal diameter. The shell 90 serves to restrict lateral movement of the central portion 18 relative to the inner margins of the wide portions 17—17 of the filler neck 13 and thereby to prevent the ends of the latch bolts 68—68 from being unauthorizedly or inadvertently disengaged from their abutting position with respect to the narrow portions 16—16 of the flange 15. In other words, the shell 90 restricts the amount of "play" between the filler neck and the central portion 18 thereby cooperating with the latch bolts 68—68 to maintain the device 10 in securely locked engagement on the filler neck no matter what the underengaging position of the bolts 68—68 is in relation to the flange 15. In utilizing the device 10 on the fuel tanks of vehicles wherein the internal diameter of the filler neck opening is too small to permit the insertion therein of the central portion 18 with the shell 90 attached, the shell 90 advantageously is simply removed by unfastening screws 84—84 and is then discarded. Thereafter the screws 84—84 are reengaged in the bosses 24—24 and the central portion 18 is inserted into the filler neck. The central portion 18 in such smaller dimensioned filler necks serves the same function as the shell 90 does in the larger dimensioned filler necks.

The versatility of the device 10 as a locking cap for filler necks of fuel tanks in a wide variety of vehicles is enhanced and augmented by providing the device with the uniquely constructed sealing member, designated generally in the drawings by numeral 22. The sealing member 22 desirably is formed of a rubber-like material, preferably of a synthetic character, which will resist attack by fuel to be introduced into the vehicle fuel tank. As clearly shown in FIG. 4 of the drawings, the sealing member 22 comprises an upper, substantially cylindrical annular sleeve portion 100 for engaging the upper cylindrical area of the central portion 18. The topmost edge of the sleeve portion 100 abuts the annular shoulder 20. The sleeve portion 100 is joined at its lower margin to an outwardly extending substantially horizontal upper leg 102 of an L-shaped annular stepped portion 104. The outermost margin of the leg 102, in turn, is joined to a downwardly extending substantially vertical lower leg 106 of the portion 104. The leg 106 at its lowermost margin is joined substantially centrally to the upper surface of a wide foot or base portion 108 having a wide smooth, flat, filler neck top flange engaging seating surface 110. This arrangement of the stepped portion 104 and the foot portion 108 of the sealing member 22 limits the extent to which the base portion 108 can flex upwardly on either side of the lower leg 106 of the portion 104 and enables a substantially fluid tight seal to be obtained between the sealing member 22 and the flange of filler necks of various diameters and configurations. The width of the foot portion 108 and the substantially central location of the lower leg 106 of the stepped portion 104 with respect to the upper surface of the portion 108 permits the foot portion 108, when the device 10 is locked on a filler neck, to flex only so much as is necessary to enable the lower surface 110 of the foot portion 108 to conform to and provide optimum surface contact with the flange of a filler neck. This action is complemented by the slight upward flexure or pivoting of the L-shaped stepped portion 104 when the device is locked in position on a filler neck.

In utilizing the closure device of this invention as a locking cap, it is merely necessary for an operator to align the latch bolts 68—68 with the cut away portions of the flange 15 of the filler neck and to exert sufficient downward pressure on the device to compress the springs 70—70. This will cause the latch bolts 68—68 to move inwardly with respect to the central portion 18 and enable the ends of the bolts to clear the inner edge of the narrow portions 16—16 of the flange. The bolts 68—68 will then snap into locking underengagement with the portions 16—16. The operation requires minimum effort on the part of the operator and it is not necessary to use the key. When it is desired to remove the device from the filler neck, it is merely necessary to place the key into the plug 40 and turn the key to retract the latch bolts 68—68 against the action of the compression springs 70—70. The multiplier disc 60 associated with the plug 40 serves to increase the throw of the locking mechanism thereby enabling the latch bolts 68—68 to be withdrawn inwardly with respect to the central portion 18 a distance sufficient to clear the innermost edge of the flange 15 of the filler neck no matter where the latch bolts 68—68 are located with respect to the flange. After the latch bolts 68—68 have been retracted a distance sufficient to clear the inner edge of the flange 15, it is merely necessary to lift the device off the filler neck.

It should be understood that various modifications can be made in the preferred form of the invention hereinabove described without deviating from the broader aspects thereof.

What is claimed is:

1. A locking cap for the filler necks of fuel tanks in a variety of vehicles wherein each filler neck has an inwardly extending flange at the top thereof defining an opening for the filler neck, the internal diameter of the openings of at least one or more of said filler necks being substantially smaller than the opening of at least one of the other filler necks, said cap comprising: a filler neck closing cap portion from which downwardly extends a central body portion, a locking mechanism carried by said central body portion and including retractable locking bolts for underlying the filler neck flanges and retaining the cap on said filler necks, said central body portion having an outer extent enabling it to fit with limited clearance within said smaller filler neck openings, said locking cap further including a removable shell member carried by said central portion and having an outer extent substantially greater than that of said central body portion as to fit with limited clearance within said larger of said filler neck openings to prevent said retractable locking bolts of said locking mechanism from being unauthorizedly or inadvertently disengaged from beneath the flange, said shell member when removed from said central body portion of said cap enabling said central body portion of said cap to be inserted into and locked within said smaller filler neck openings.

2. A locking cap for the filler necks of fuel tanks in a variety of vehicles wherein each filler neck has an inwardly extending flange at the top thereof defining an opening for the filler neck, the internal diameter of the openings of at least one or more of said filler necks being substantially smaller than the opening of at least one of the other filler necks, said cap comprising: a filler neck closing cap portion from which downwardly extends a central body portion, a locking mechanism carried by said central body portion and including retractable locking bolts for underlying the filler neck flanges and retaining the cap on said filler necks, said central body portion having an outer extent enabling it to fit with limited clearance within said smaller filler neck openings, said locking cap further including an open top substantially cylindrical shell member for said central body portion which shell member has a bottom wall releasably secured to said central portion and an upwardly extending wall overlying the sides of the central body portion by an appreciable extent, said upwardly extending wall of the shell member having opposed longitudinally extending slots therein serving as throughways for said retractable locking bolts, said upwardly extending wall of said shell member having an outermost extent substantially greater than that of said central body portion as to fit with limited clearance with said larger of said filler neck openings to prevent said retractable locking bolts of said locking mechanism from being unauthorizedly or inadvertently disengaged from beneath said flange, said shell member when removed from said central body portion of said cap enabling said central body portion of said cap to be inserted into and locked within said smaller filler neck openings.

3. In a combination, a filler neck for a vehicle fuel tank or the like wherein the filler neck has an inwardly extending flange at the top thereof defining an opening for the filler neck and have diametrically opposed ear-receiving radial slots for receiving the bayonet joint forming ear portions of a conventional gas cap, said slots leaving relatively narrow flange portions, and a locking cap for the filler neck comprising a filler neck closing cap portion and a downwardly extending central body portion extending into said filler neck in substantial spaced relation to the inner margins of said flange of said filler neck, said central body portion having an outer extent enabling it to fit with limited clearance within said filler neck openings of standard smaller sized filler necks, a locking mechanism carried by said central body portion and including retractable locking bolts underlying the narrow portions of the flange and retaining said cap on said filler neck, said locking cap further including a removable shell member carried by said central portion and having an outer extent substantially greater than that of said central body portion to fit with limited clearance within said filler neck flanges to restrict lateral movement of the cap within said filler neck opening and prevent the retractable locking bolts of the locking mechanism from being unauthorizedly or inadvertently disengaged from beneath said narrow flange portions, said shell member when removed from said central body portion of said cap enabling said central body portion of said cap to be inserted with limited clearance into and locked within said smaller filler neck openings.

4. A locking cap for the filler necks of fuel tanks in a variety of vehicles wherein each filler neck has an inwardly extending flange at the top thereof defining an opening for the filler neck, the internal diameter of the openings of at least one or more of said filler necks being substantially smaller than the opening of at least one of the other filler necks, the flange of each of said filler necks having diametrically opposed ear-receiving radial slots extending part way through the flange from the inner margin thereof for receiving the bayonet-joint forming ear portions of a conventional gas cap, said slots leaving relatively narrow flange portions, said cap comprising: a filler neck closing cap portion from which downwardly extends a central body portion, said central body portion having an outer extent enabling it to fit with limited clearance within said smaller filler neck opening, a locking mechanism carried by said central body portion and including retractable locking bolts for underlying the filler neck flanges and retaining the cap on the filler necks, said locking mechanism further including a key receiving lock plug having a pair of oppositely spaced, downwardly extending locking bolt engaging lugs at the base thereof serving normally to retract said locking bolts through the agency of a key turned in said lock plug, a multiplier disc having a diameter greater than that of said base of said lock plug, said disc having a pair of openings for receiving said lugs at said base of said lock plug and having a pair of oppositely spaced, downwardly extending locking bolt engaging lugs positioned on its lower surface at the outer edge thereof, said multiplier disc enabling said locking bolts to extend outwardly from said central body portion a distance sufficient to underlie substantially the full width of said narrow flange portions of said variously sized filler neck openings, and to be retracted from said underlying relation with respect to any portion of said flange, said locking cap further including a removable shell member carried by said central portion and having an outer extent substantially greater than that of said central body portion as to fit with limited clearance within the larger of said filler neck openings to prevent the retractable locking bolts of the locking mechanism from being unauthorizedly or inadvertently disengaged from beneath said flange, said shell member when removed from said central body portion of said cap enabling said central body portion of said cap to be inserted into and locked within said smaller filler neck openings.

5. A locking cap for the filler necks of fuel tanks in a variety of vehicles wherein each filler neck has an inwardly extending flange at the top thereof defining an opening for the filler neck, the internal diameter of the openings of at least one or more of said filler necks being substantially smaller than the opening of at least one of the other filler necks, said cap comprising: a filler neck closing cap portion from which downwardly extends a central body portion, a locking mechanism carried by said central body portion and including retractable locking bolts for underlying said filler neck flanges and retaining said cap on said filler necks, said central body portion having an outer extent enabling it to fit with limited clearance within said smaller filler neck openings, a resilient flange engaging sealing member for said locking cap, said sealing member having an upper portion secured to said cap below said filler neck closing portion, an annular intermediate outwardly extending stepped portion, the lowermost leg of said stepped portion being joined at its lower margin to the medial portion only of an annular base portion having a wide, substantially flat flange engaging bottom seating surface and extending inwardly and outwardly beyond said annular intermediate portion to form upwardly flexible portions on both sides thereof, the upward flexure of said flexible base portions when said seating surface is engaged on said flange being limited by the centralized location of said lowermost leg of said intermediate portion with respect to said base portion, thereby enabling the wide bottom seating surface to conform to said flange irrespective of its width and configuration to provide an optimum seal between said flange and said sealing member, said locking cap further including a removable shell member carried by said central portion and having an outer extent substantially greater than that of said central body portion as to fit with limited clearance within the larger of said filler neck openings to prevent said retractable locking bolts of said locking mechanism from being unauthorizedly or inadvertently disengaged from beneath said flange, said shell member when removed from said central body portion of said cap enabling said central body portion of said cap to be inserted into and locked within said smaller filler neck openings.

6. A locking cap for the filler necks of fuel tanks in a variety of vehicles wherein each filler neck has an inwardly extending flange at the top thereof defining an opening for said filler neck, the internal diameter of the openings of at least one or more of said filler necks being substantially smaller than the opening of at least one of the other filler necks, said cap comprising: a filler neck closing cap portion from which downwardly extends a central body portion which fits within all of said filler neck openings, a locking mechanism carried by said central body portion and including retractable locking bolts for underlying the filler neck flanges and retaining said cap on said filler necks, and a resilient, flange engaging, sealing member for said locking cap, said sealing member having an upper portion secured to the cap below said filler neck closing portion, an annular intermediate portion joined at its lower margin to the medial portion only of an annular base portion having a wide flange engaging bottom seating surface, and extending inwardly and outwardly beyond said annular intermediate portion to form upwardly flexible portions on both sides thereof, the upward flexure of said flexible base portions when said seating surface is engaged on said flange being limited by the centralized location of said intermediate portion with respect to said base portion, thereby enabling the wide bottom seating surface to conform to said flange irrespective of its width and configuration to provide an optimum seal between said flange and said sealing member.

7. A locking cap for the filler necks of fuel tanks in a variety of vehicles wherein each filler neck has an inwardly extending flange at the top thereof defining an opening for the filler neck, the internal diameter of the openings of at least one or more of said filler necks being substantially smaller than the opening of at least one of the other filler necks, said cap comprising: a filler neck closing cap portion from which downwardly extends a central body portion, which fits within all of said filler neck openings, a locking mechanism carried by said central body portion and including retractable locking bolts for underlying said filler neck flanges and retaining said cap on said filler necks, a resilient, flange engaging, sealing member for said locking cap, said sealing member having an upper portion secured to the cap below said filler neck closing portion, an annular intermediate outwardly extending stepped portion, the lowermost leg of said stepped portion being joined at its lower margin to the medial portion only of an annular base portion having a wide, substantially flat flange engaging bottom seating surface, and extending inwardly and outwardly beyond said annular intermediate portion to form upwardly flexible portion on both sides thereof, the upward flexure of said flexible base portions when said seating surface is engaged on said flange being limited by the centralized location of said lowermost leg of said intermediate portion with respect to said base portion, thereby enabling the wide bottom seating surface to conform to said flange irrespective of its width and configuration to provide an optimum seal between said flange and said sealing member.

References Cited by the Examiner

UNITED STATES PATENTS

| 1,786,332 | 12/1930 | Bradshaw | 70—165 |
| 2,796,192 | 6/1957 | Nehls | 70—169 X |
| 2,816,433 | 12/1957 | Friend | 70—169 |
| 2,880,903 | 4/1959 | Nehls | 70—169 |

BOBBY R. GAY, *Primary Examiner*.